(12) United States Patent
Zieger et al.

(10) Patent No.: US 9,880,568 B2
(45) Date of Patent: Jan. 30, 2018

(54) PRESSURE REGULATORS FOR FEEDING FUEL, AND FUEL-SUPPLYING SYSTEM COMPRISING A REGULATING UNIT THAT CONSISTS OF SAID PRESSURE REGULATORS

(75) Inventors: Andreas Zieger, Hofstätten an der Raab (AT); Thomas Höller, Lebring (AT)

(73) Assignee: Hyptec GmbH, Lebring (AT)

( * ) Notice: Subject to any disclaimer, the term of this patent is extended or adjusted under 35 U.S.C. 154(b) by 0 days.

(21) Appl. No.: 13/635,675

(22) PCT Filed: Mar. 18, 2011

(86) PCT No.: PCT/EP2011/054099
§ 371 (c)(1),
(2), (4) Date: Nov. 21, 2012

(87) PCT Pub. No.: WO2011/113922
PCT Pub. Date: Sep. 22, 2011

(65) Prior Publication Data
US 2013/0056097 A1 Mar. 7, 2013

(30) Foreign Application Priority Data
Mar. 18, 2010 (DE) .................. 10 2010 003 016

(51) Int. Cl.
*F16K 27/00* (2006.01)
*G05D 16/20* (2006.01)

(52) U.S. Cl.
CPC ...... *G05D 16/204* (2013.01); *Y10T 137/0318* (2015.04); *Y10T 137/7804* (2015.04); *Y10T 137/87314* (2015.04)

(58) Field of Classification Search
CPC ............. G05D 16/204; G05D 16/2026; G05D 16/2046; F16K 31/0648; F16K 31/0686;
(Continued)

(56) References Cited

U.S. PATENT DOCUMENTS 1,228,104 A * 5/1917 Fulton ........................... 137/489
4,760,694 A * 8/1988 Gillon, Jr. ............... B64G 1/26
137/599.16
(Continued)

FOREIGN PATENT DOCUMENTS

AT 004 536 U1 8/2001
CN 1185213 A 6/1998
(Continued)

OTHER PUBLICATIONS

Machine Translation of DE2937978 from EPO website on May 30, 2014.*
(Continued)

*Primary Examiner* — Jessica Cahill
(74) *Attorney, Agent, or Firm* — Kilpatrick Townsend & Stockton LLP

(57) ABSTRACT

A pressure control for a fuel supply device to supply fuel from a reservoir to a user includes at least two flow paths between a high-pressure chamber and a low-pressure chamber, and an operable closure unit for opening and closing of the at least two flow paths.

22 Claims, 18 Drawing Sheets

(58) Field of Classification Search
CPC ..... Y10T 137/87314; Y10T 137/87265; Y10T 137/87378; Y10T 137/87507; Y10T 137/7835
USPC ............ 137/599.01, 599.05, 599.06, 599.07, 137/599.16, 601.14; 251/129.15
See application file for complete search history.

(56) References Cited

U.S. PATENT DOCUMENTS

| | | | |
|---|---|---|---|
| 5,289,811 A * | 3/1994 | Covert et al. .................. | 123/520 |
| 5,351,656 A | 10/1994 | Teramoto et al. | |
| 5,755,254 A | 5/1998 | Carter et al. | |
| 5,875,817 A * | 3/1999 | Carter ....................... | 137/599.06 |
| 6,234,204 B1 * | 5/2001 | van den Wildenberg ............ | 137/599.07 |
| 7,159,611 B2 | 1/2007 | Larsen | |
| 8,136,791 B2 | 3/2012 | Denis et al. | |
| 2002/0026960 A1 * | 3/2002 | Weldon ................... | 137/601.14 |
| 2003/0226588 A1 | 12/2003 | Olander et al. | |
| 2006/0054144 A1 | 3/2006 | Tokunaga | |
| 2006/0162778 A1 * | 7/2006 | Nichols et al. ............... | 137/204 |
| 2008/0047619 A1 * | 2/2008 | Pechtold .................. | 137/505.41 |
| 2008/0247882 A1 | 10/2008 | Earhart et al. | |
| 2009/0212244 A1 * | 8/2009 | Pfaff et al. ................. | 251/30.03 |
| 2010/0242921 A1 * | 9/2010 | Harper .......................... | 123/506 |

FOREIGN PATENT DOCUMENTS

| | | |
|---|---|---|
| CN | 101144437 A | 3/2008 |
| CN | 101297152 A | 5/2010 |
| DE | 2937978 A1 | 4/1981 |
| DE | 29 37 978 A1 | 4/1984 |
| DE | 40 16 140 A1 | 1/1991 |
| DE | 4016140 A1 | 1/1991 |
| DE | 10204746 A1 | 8/2003 |
| DE | 60021694 T2 | 3/2006 |
| DE | 603 06 484 T2 | 11/2006 |
| DE | 60306484 T2 | 11/2006 |
| DE | 102008034581 A1 | 1/2009 |
| EP | 1 120 561 A2 | 8/2001 |
| FR | 2 905 773 A1 | 3/2008 |
| FR | 2905773 A1 | 3/2008 |
| GB | 2 129 170 A | 5/1984 |
| GB | 2129170 A | 5/1984 |
| JP | 38-026482 B | 12/1963 |
| JP | 61-58964 A | 3/1986 |
| JP | H04-018797 U | 2/1992 |
| JP | H05-126105 A | 5/1993 |
| JP | H05-209557 A | 8/1993 |
| JP | 3040627 U | 8/1997 |
| JP | H11-107860 A | 4/1999 |
| JP | 2000-009240 A | 1/2000 |
| JP | 2000-248997 A | 9/2000 |
| JP | 2001066020 A | 3/2001 |
| JP | 2003-083172 A | 3/2003 |
| JP | 2004-052713 A | 2/2004 |
| JP | 2005-044278 A | 2/2005 |
| JP | 2005-053358 A | 3/2005 |
| JP | 2005-069456 A | 3/2005 |
| JP | 2007-170443 A | 7/2007 |
| WO | 2008/029073 A1 | 3/2008 |
| WO | WO 2008029073 A1 * | 3/2008 |

OTHER PUBLICATIONS

Machine Translation of FR 2905773 from EPO website on May 30, 2014.*
Machine Translation of JP2001066020 (Retrieved from EPO website on Oct. 3, 2016).*
International Search Report and Written Opinion in Application No. PCT/EP2011/054099 dated Jan. 14, 2013.
International Search Report dated Jun. 27, 2012 for PCT Patent Application No. PCT/EP2011/054099, 5 pages.
First Office Action dated Sep. 29, 2014 in CN Patent Application No. 201180014425.2, 23 pages.
Office Action dated Oct. 27, 2015 in JP Patent Application No. 2012-557562, 20 pages.
European Search Report dated Aug. 12, 2016 of the corresponding European Patent Application No. 11 708 505.5 (7 pages).

* cited by examiner

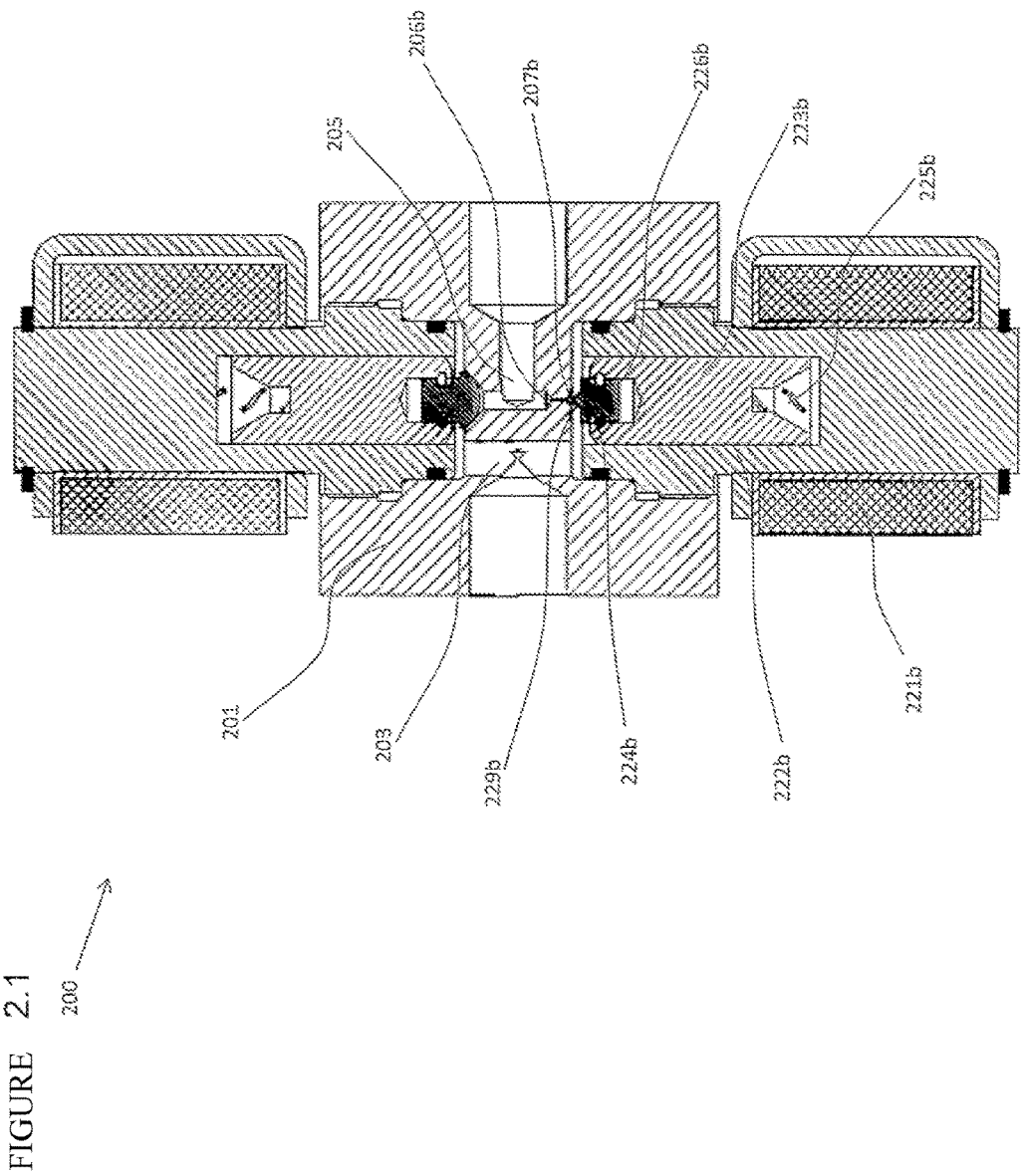
FIGURE 2.1

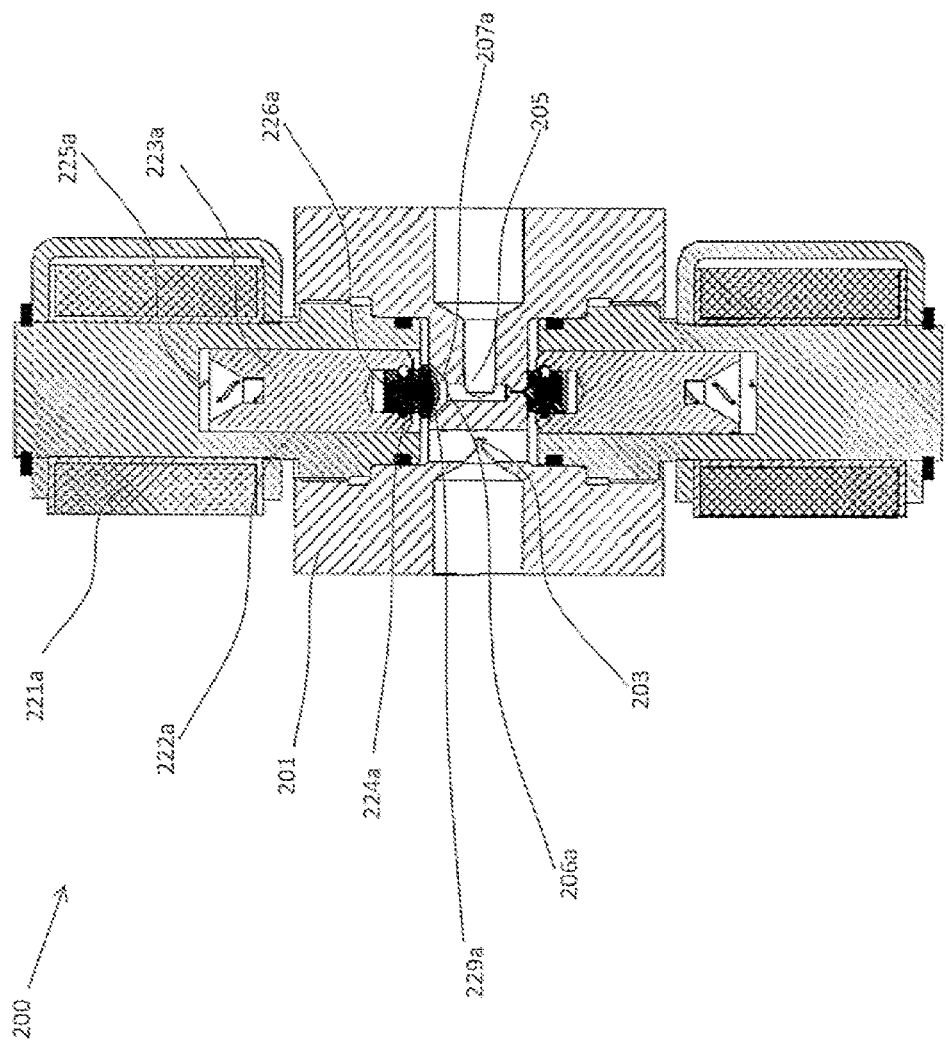
FIGURE 2.2

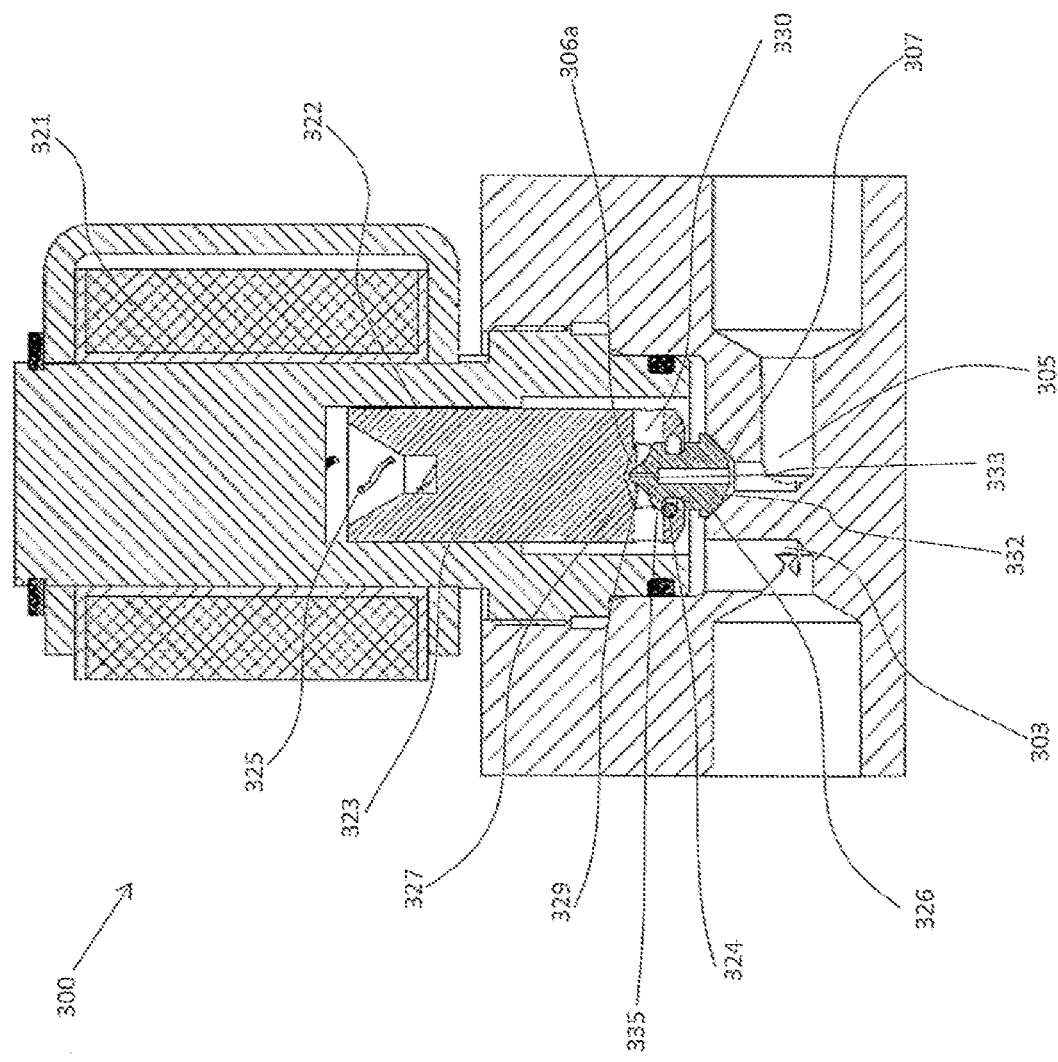
FIGURE 3.1

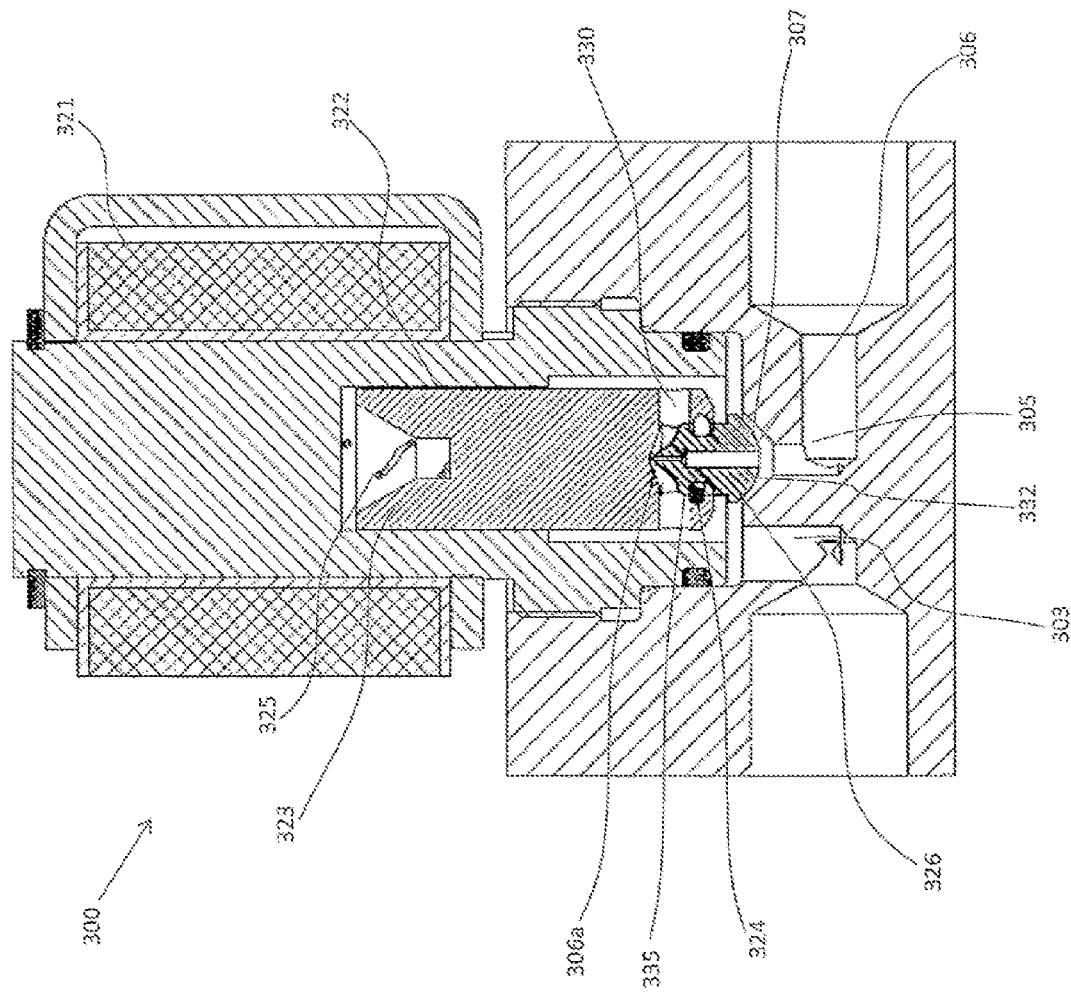
FIGURE 3.2

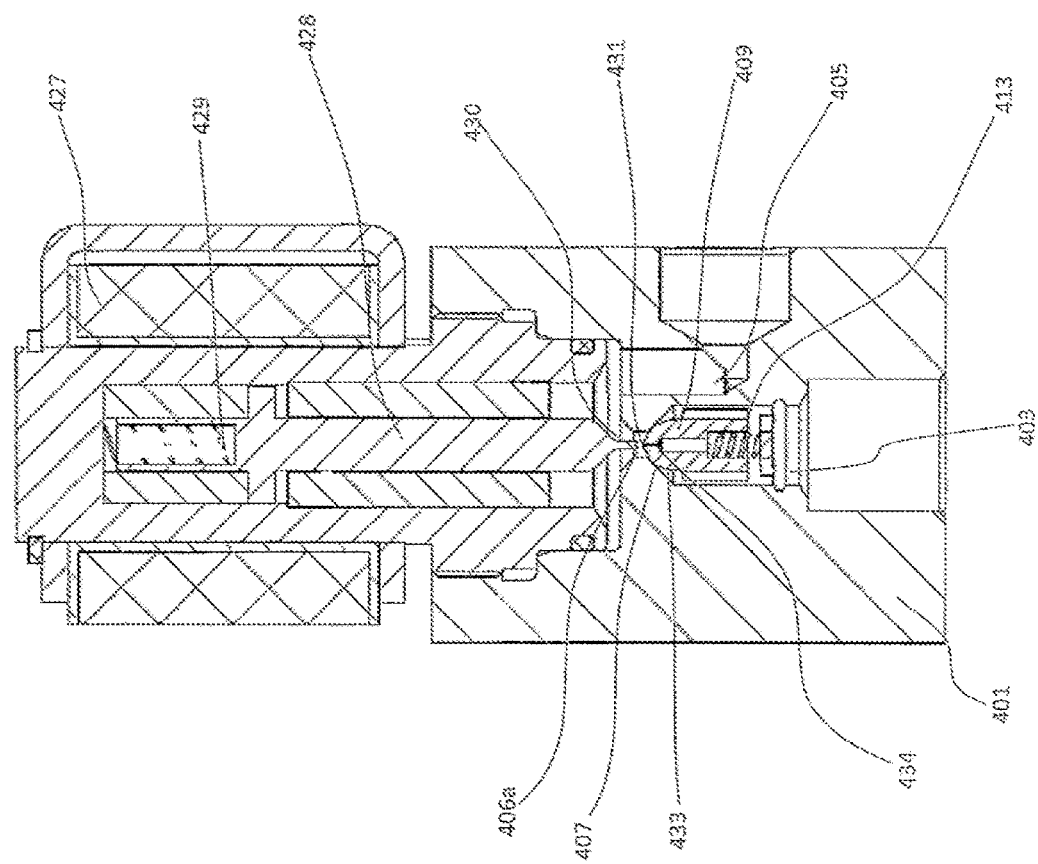
FIGURE 4.1

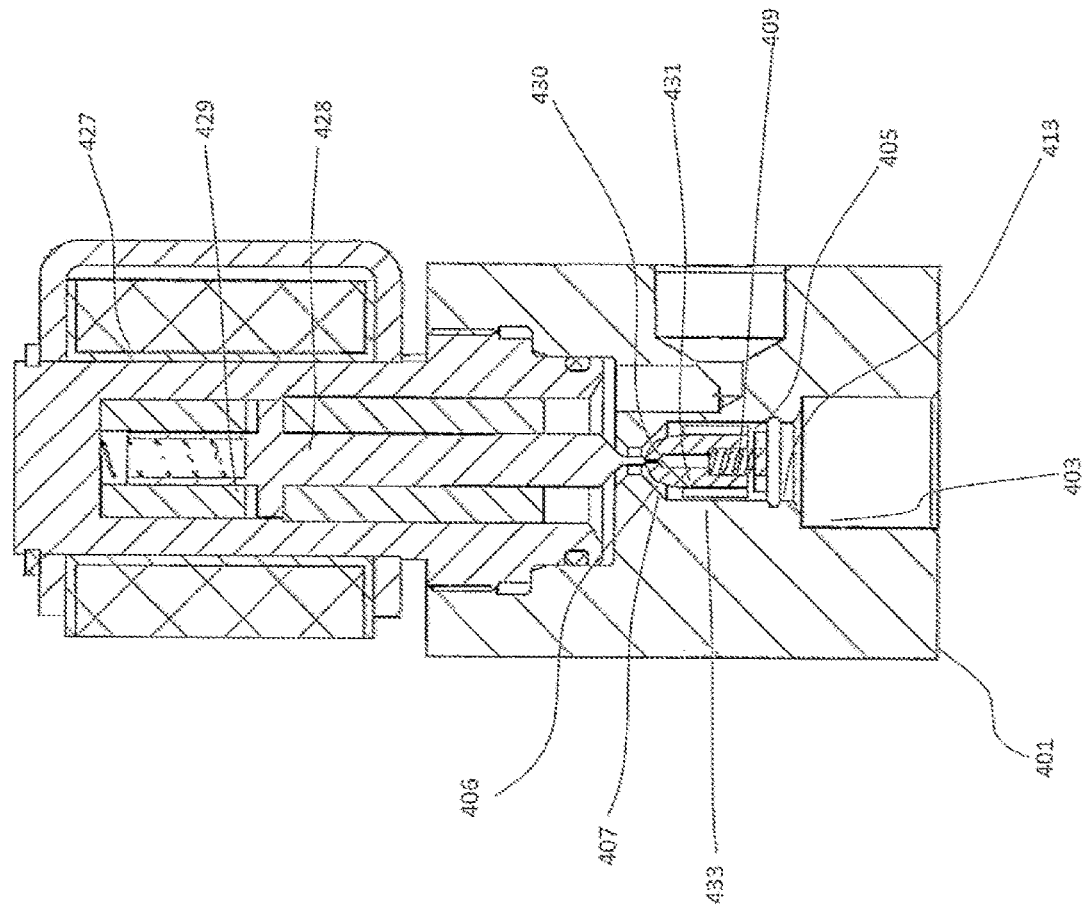
FIGURE 4.2

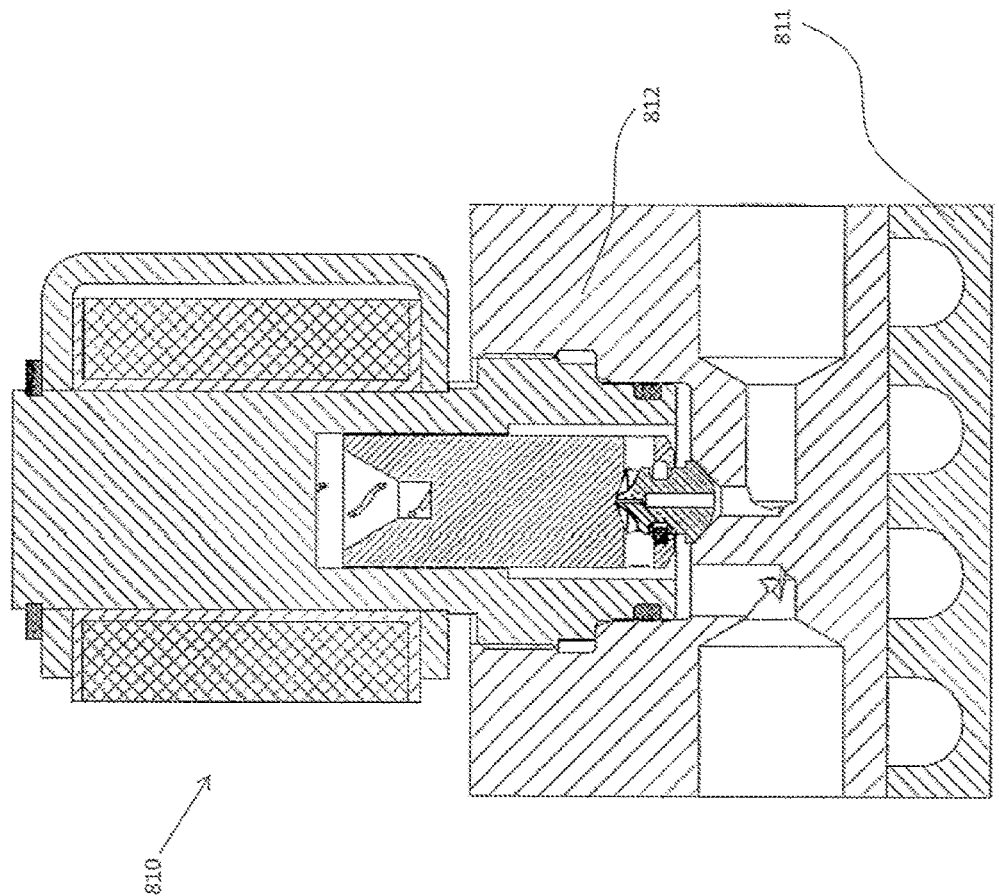
FIGURE 8.1

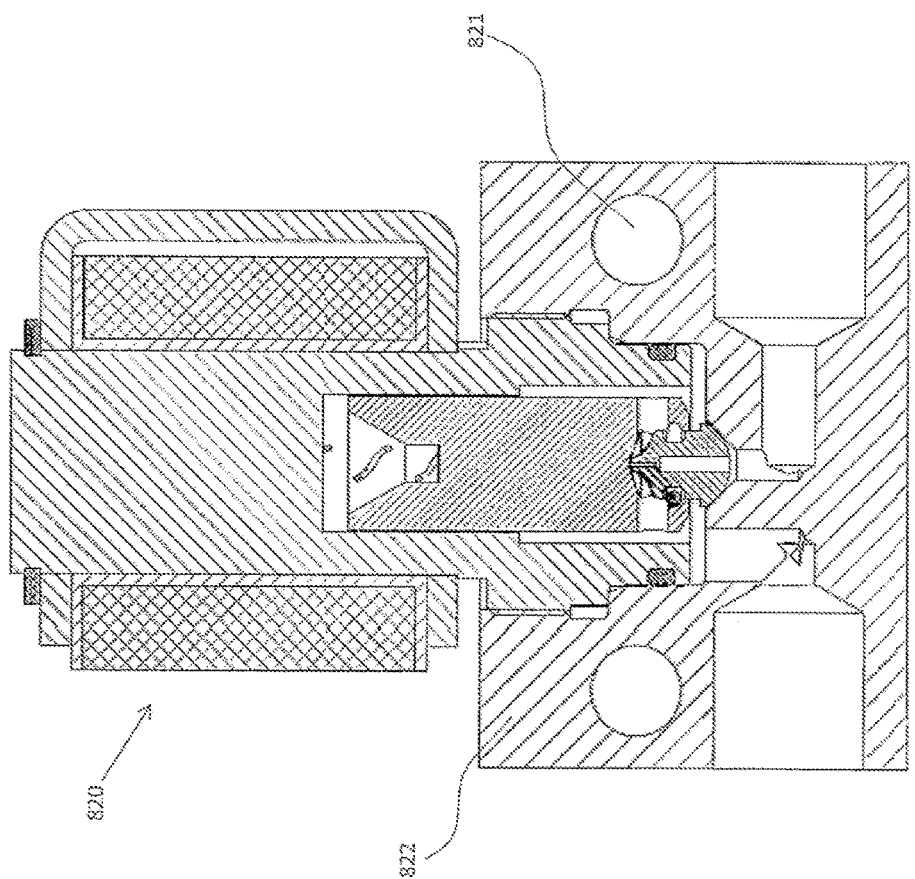
FIGURE 8.2

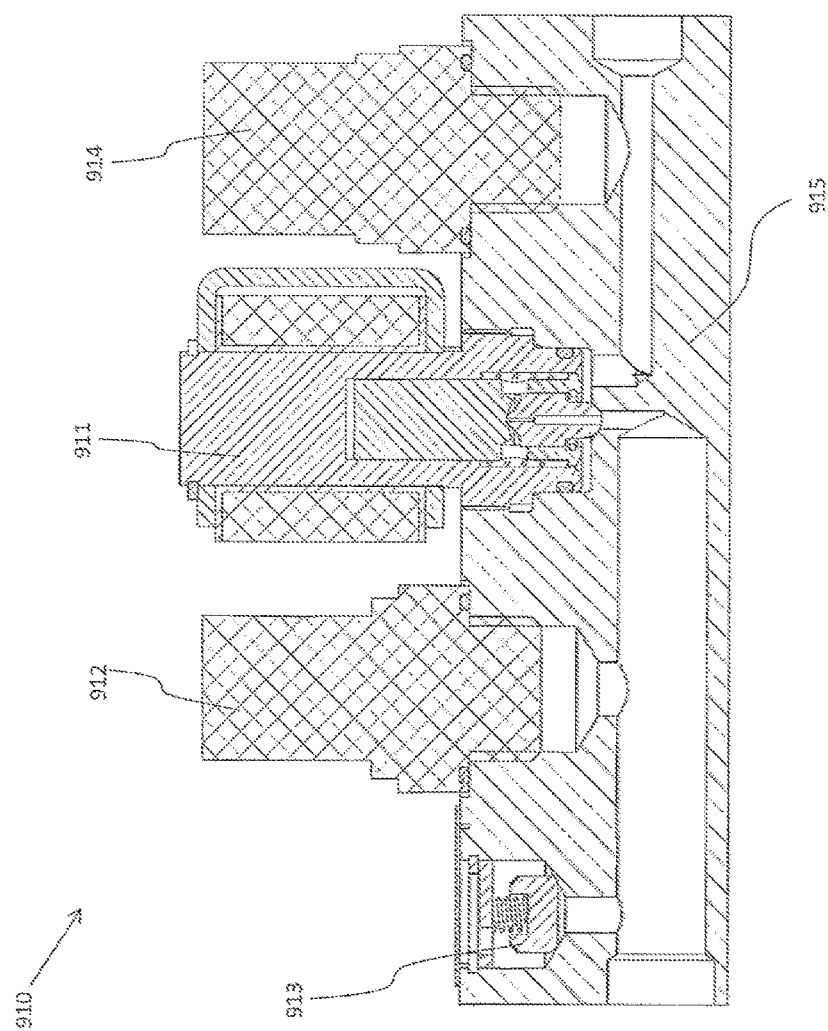
FIGURE 9.1

PRESSURE REGULATORS FOR FEEDING FUEL, AND FUEL-SUPPLYING SYSTEM COMPRISING A REGULATING UNIT THAT CONSISTS OF SAID PRESSURE REGULATORS

This application is a national stage of Patent Cooperation Treaty (PCT) International Application No. PCT/EP2011/054099, filed Mar. 18, 2011, which claims priority to the German Patent Application No. 102010003016.3, filed Mar. 18, 2010, the disclosures of which are incorporated by reference herein.

The present invention relates to a fuel supply device and a pressure control for a fuel supply device to supply fuel from a reservoir to a user, and a method for pressure control.

Alternative gaseous energy carriers, such as natural gas, methane, bio-gas, and hydrogen are increasingly important in transportation due to their $CO_2$-savings potential and for reasons of reliable supplies. These energy carriers are typically stored in a compressed form in pressurized cylinders at nominal pressures of up to 700 bars to obtain the required mileages and supplied to the user at an operating pressure of approx. 10 bars.

The pressure control has the objective to reduce the stored gas from the storage pressure to a predetermined operating pressure, usually depending on the operating conditions of the vehicle, and thus it represents an essential element of a fuel supply system.

One trained in the art knows various embodiments for pressure controls:

A mechanic one-stage pressure control according to prior art is known from U.S. Pat. No. 7,159,611: Using a mechanic pressure reduction unit the storage pressure is reduced to the operating pressure, with the operating pressure varying in a wide range due to the one-stage mechanic construction and is adjusted unchangeable during operation.

A mechanic two-stage pressure control according to prior art is known from DE 600 21 694: With two mechanic and serially arranged pressure reduction units the storage pressure is reduced to the operating pressure, with the operating pressure being adjusted unchangeably by the two-stage mechanic design during operation and the pressure control is built protruding.

An electro-mechanic one-stage pressure control according to prior art is known from DE 102 04 746: With a one-stage mechanic pressure reduction unit supported by a magnetic coil the storage pressure is reduced to the operating pressure, with during operation the operating pressure can be adjusted by the one-stage combined design only within a narrow range determined by the magnetic force.

An electro-mechanic two-stage pressure control according to prior art is known from DE 10 2008 034 581: Using a mechanic pressure reduction unit and a subsequent electronic proportional valve the storage pressure is reduced to the operating pressure, with here a projecting and complex component is yielded due to the two-stage combined design.

From the different pressure controls according to prior art a flow path is known between the inlet side high-pressure chamber and the outlet side low-pressure chamber, with in one-stage pressure controls a closure unit is provided and in two and/or multi-stage pressure controls two and/or several closure units are arranged serially in a flow path between the inlet side high-pressure chamber and the outlet side low-pressure chamber, opening and closing the flow path in a suitable fashion.

The invention avoids the disadvantages of prior art and provides a pressure control for arbitrary inlet pressures in a compact and simple design, which at low power levels during operation provides a variable outlet pressure according to the control signal with highly controlled precision over a wide range and shows the following advantages:

Compact design by selected functional principles
High adaptability by electronic control
High inert sealing by large pressure area and return spring
Waiver of a system shut-off valve by high inert sealing
Powerless sealing by the container pressure
High operational security by a robust design and a low number of components
Low production costs by a low number of components
High variability by a simple adjustment for different gases.

According to the invention this is achieved such that between an inlet side high-pressure chamber and an outlet side low-pressure chamber at least two flow paths are provided with a certain cross-section and which are opened or closed with a closure unit arranged at the high-pressure or the low-pressure side, with two modes of operation being distinguished:

High pressure range: At high pressures in the inlet side high-pressure chamber or at low volume flows the flow path with the smaller cross-section is released by the closure unit, with due to the area ratios low electric power is required.

Low pressure range: At low pressures in the inlet side high-pressure chamber the flow path with the larger cross-section is released by the closure unit, with due to the pressure ratios only low electric power is required.

The transfer between the two modes of operating is determined by the cross-section of the flow paths and by the operating force of the closure unit. The flow paths may be arranged side-by-side.

In the following the various embodiments of the invention are explained based on the drawings.

Figure 2:
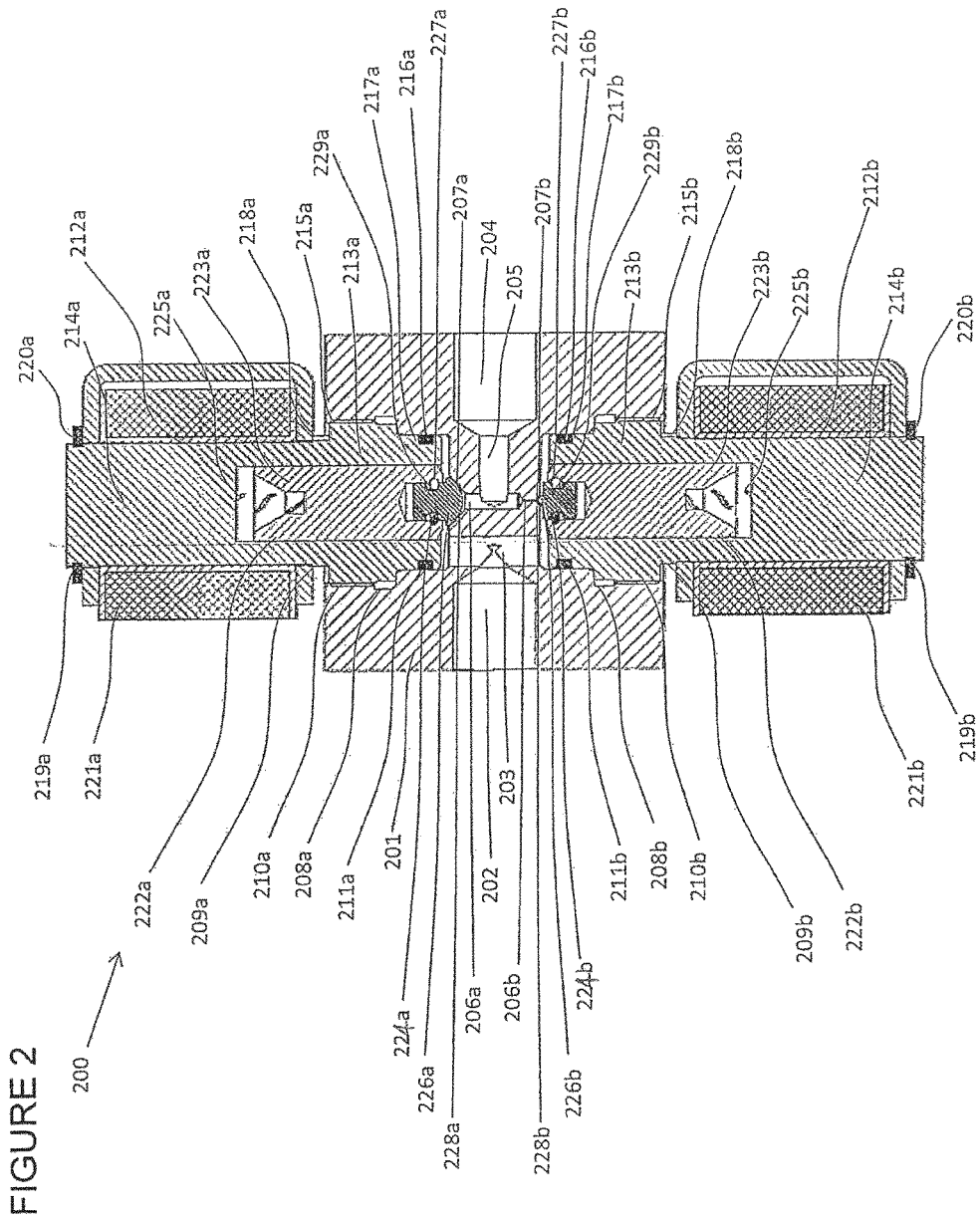
FIG. 2 shows a pressure control according to a first exemplary embodiment of the present invention in a non-excited closed state FIG. 2.1 shows a pressure control according to a first exemplary embodiment of the present invention in the excited open stated at high pressures in the inlet side high-pressure chamber (high-pressure range)

FIG. 2.2 shows a pressure control according to a first exemplary embodiment of the present invention in the excited open state at low pressures in the inlet side high-pressure chamber (low-pressure range)

Figure 3:
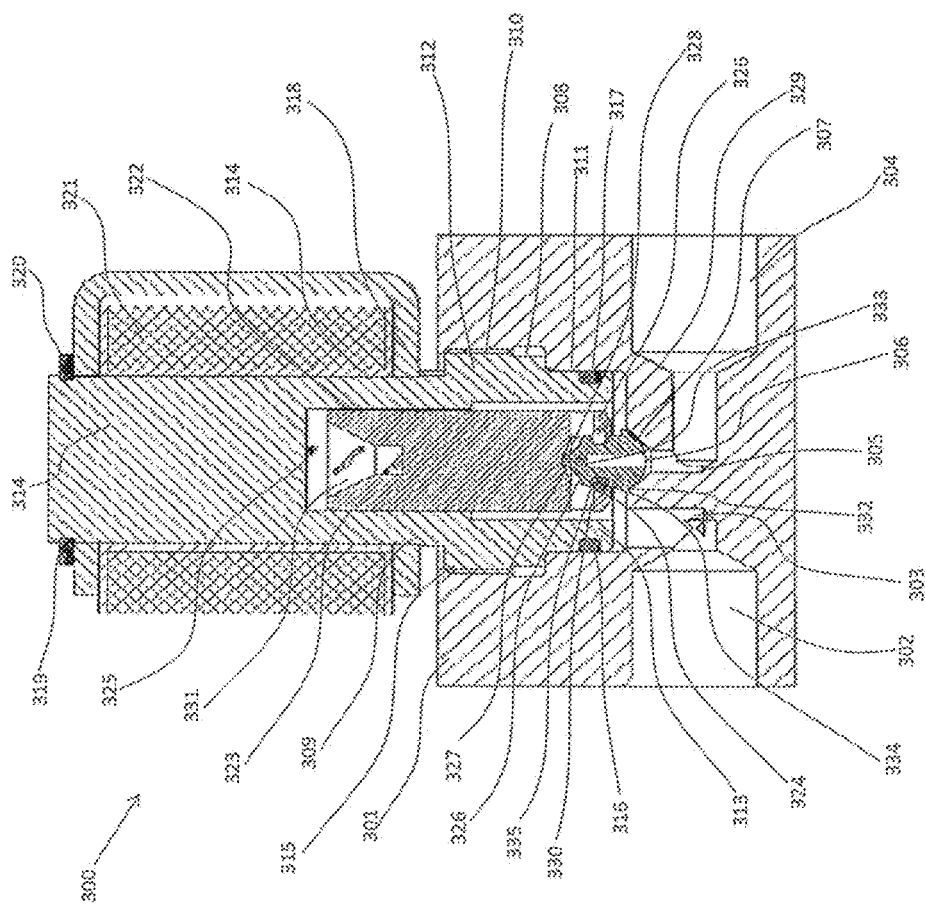

FIG. 3 shows a pressure control according to a second exemplary embodiment of the present invention in the non-excited closed state FIG. 3.1 shows a pressure control according to a second exemplary embodiment of the present invention in the excited open state at high pressures in the inlet side high-pressure chamber (high-pressure range)

FIG. 3.2 shows a pressure control according to a second exemplary embodiment of the present invention in the excited open state at low pressures in the inlet side high-pressure chamber (low-pressure range)

Figure 4:
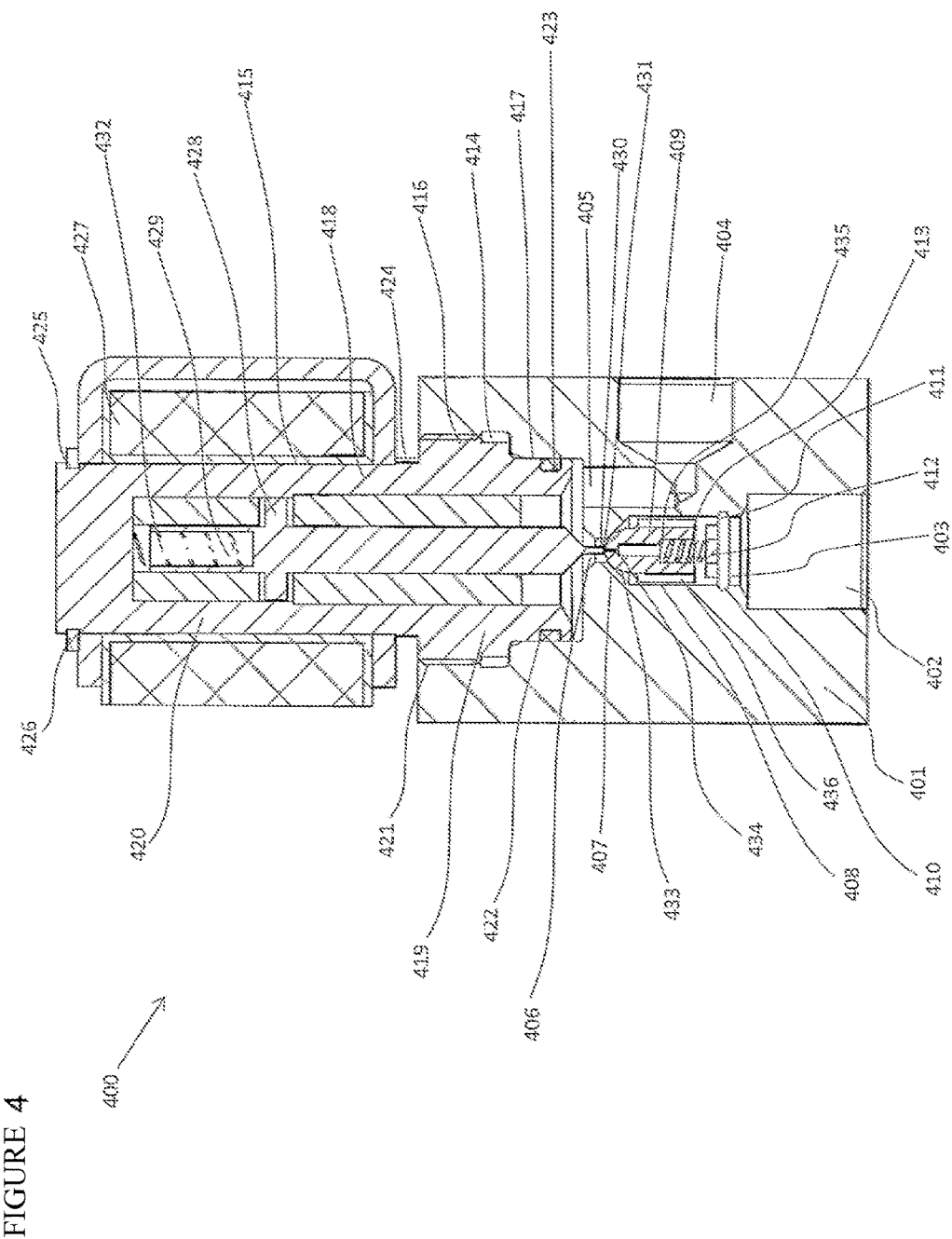

FIG. 4 shows a pressure control according to a third exemplary embodiment of the present invention in a non-excited closed state FIG. 4.1 shows a pressure control according to a third exemplary embodiment of the present invention in the excited open state at high pressures in the inlet side high-pressure chamber (high-pressure range)

FIG. 4.2 shows a pressure control according to a third exemplary embodiment of the present invention in the excited open state at low pressures in the inlet side high-pressure chamber (low-pressure range)

Figure 1:
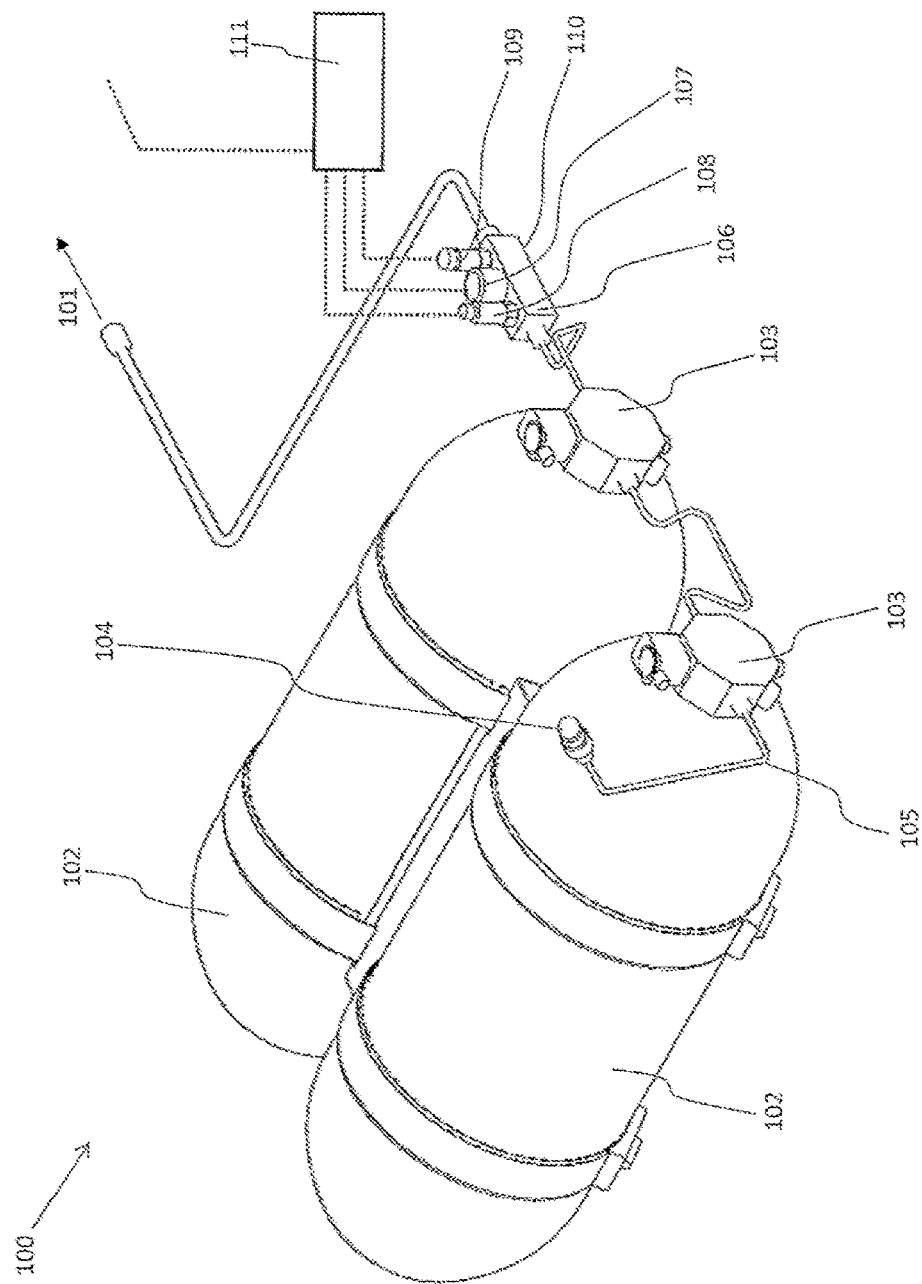
FIG. 1 shows schematically a fuel supply device of a gas-operated motor vehicle
Figure 5:
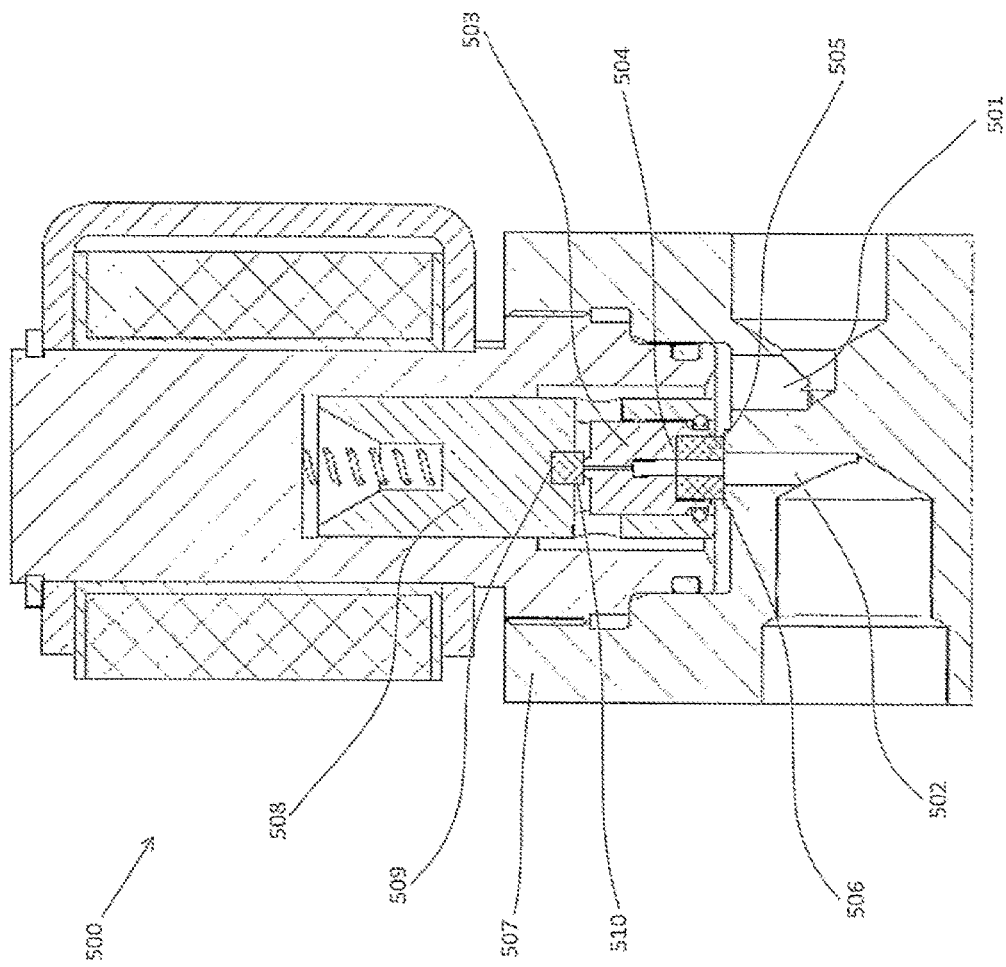
Figure 6:
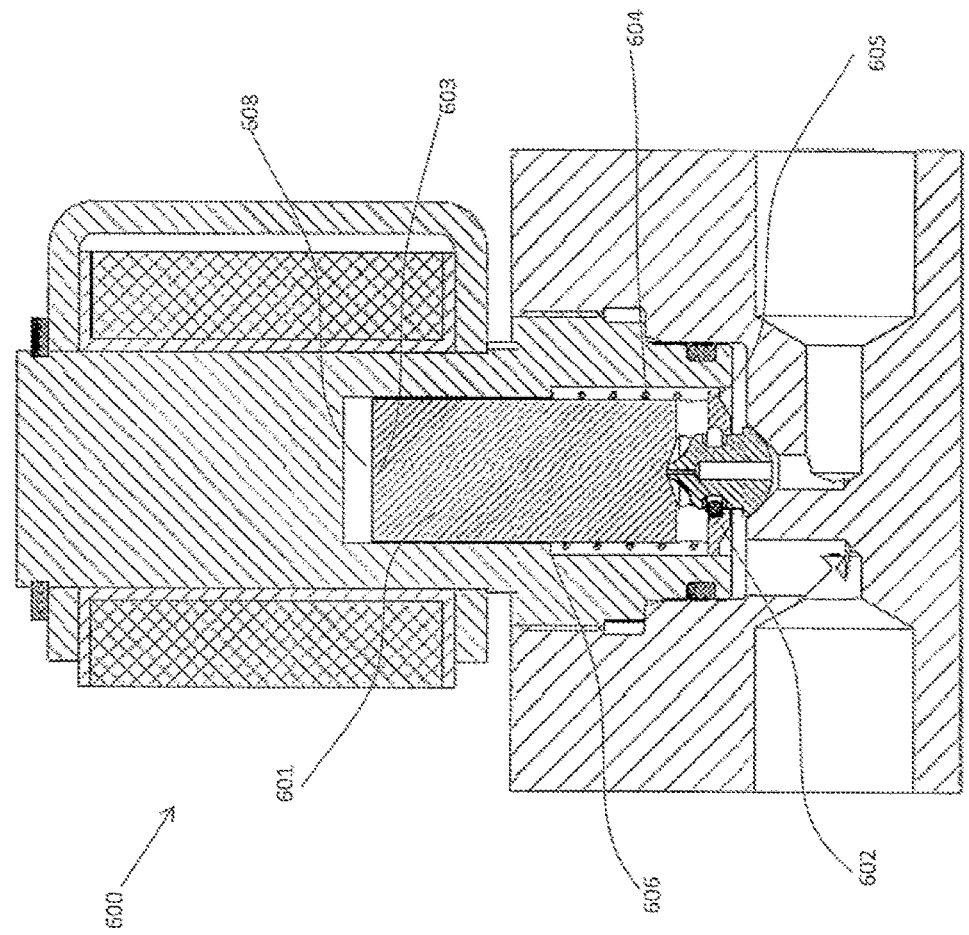
Figure 7:
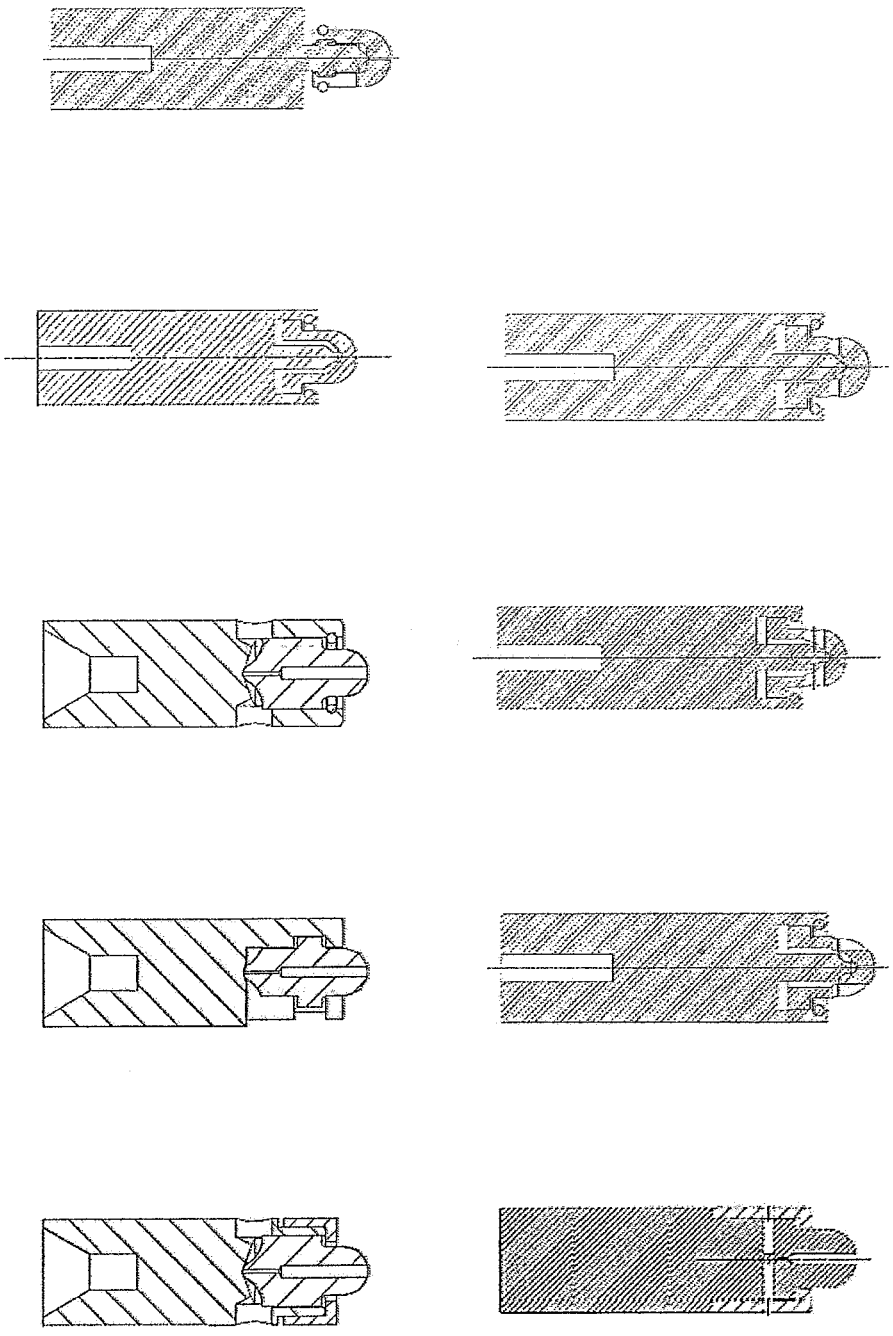
Figure 8:
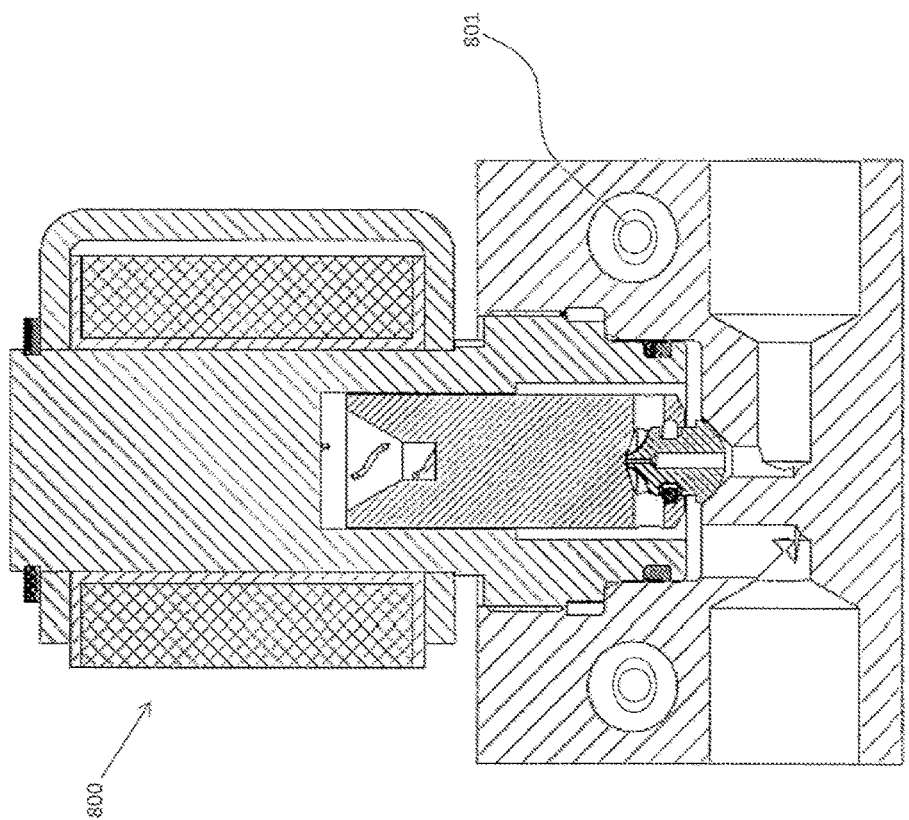
Figure 9:
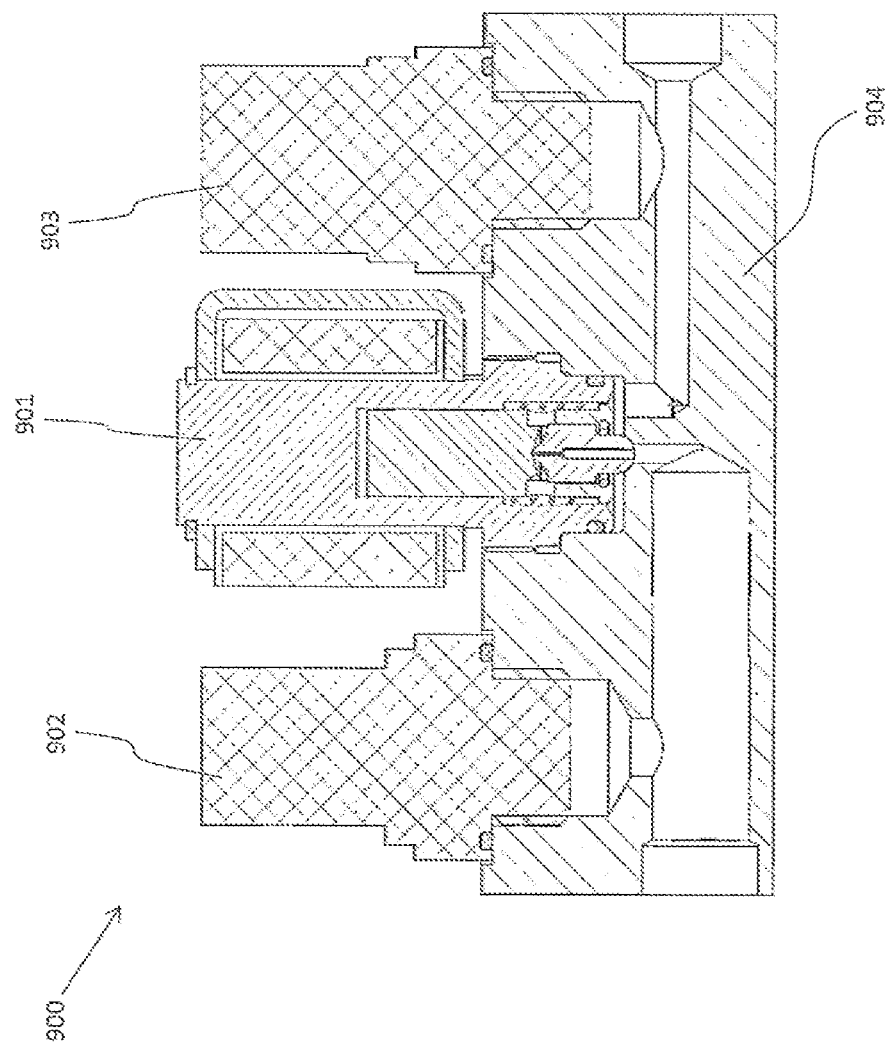

FIG. 5 shows a pressure control according to a first exemplary embodiment of the present invention in a non-excited closed stated with a modified seal of the closure body FIG. 6 shows a pressure control according to a first exemplary embodiment of the present invention in the non-excited closed state with a modified valve piston FIG. 7 shows different embodiments for the entraining function of the valve piston for the pressure control according to the invention based on the first embodiment FIG. 8 shows a pressure control according to the present invention with a first exemplary embodiment for an embodied heat exchanger FIG. 8.1 shows a pressure control according to the present invention with a second exemplary embodiment for an embodied heat exchanger FIG. 8.2 shows a pressure control according to the present invention with a third exemplary embodiment for an embodied heat exchanger FIG. 9 shows a first exemplary embodiment of a control unit with a pressure control according to the invention FIG. 9.1 shows a second exemplary embodiment of a control unit with the pressure control according to the invention As shown in FIG. 1 the fuel supply device 100, particularly of a gas-operated motor vehicle, comprises for the supply of a user 101 with gaseous fuel, such as natural gas, methane, biogas, hydrogen, or the like from one or more reservoirs 102 including a tank valve 103, which is supplied with fuel gas when refueling via a refuel coupling 104 arranged with an integrated non-return valve at the inlet side and a gas supply line 105 following thereat. Further, for discharging a control unit 106 is provided, at least comprising a pressure control 107, a high-pressure sensor 108, a low-pressure sensor 109, and safety devices 110 (high-pressure safety, low-pressure safety, thermal safety), which is controlled by a control device 111, which generates the control signal according to specifications of the user 101 and considering the storage pressure and the operating pressure.

In another embodiment the refueling, starting at the refuel coupling arranged at the inlet side and comprising an integrated reflux block, may occur via the control unit, with at the inlet side optionally a return valve and optionally a filter as well as suitable line connections are arranged to the refuel coupling and to the high-pressure reservoir.

In another embodiment the fill coupling may be integrated with an integrated reflux block in the control unit.

In another embodiment the system shut-off valve can be integrated in the control unit.

In another embodiment the pressure control can be integrated in the cylinder valve.

In another embodiment the control unit can be integrated in the cylinder valve.

As shown in FIG. 2, the pressure control 200 comprises a housing 201, in which at least one inlet 202 with a subsequent high-pressure chamber 203, an outlet 204 with an upstream arranged low-pressure chamber 205, flow paths 206a and 206b are provided between the high-pressure chamber 203 and the low-pressure chamber 205, sealing seats 207a and 207b in the flow path 206a and 206b between the high-pressure chamber 203 and the low-pressure chamber 205, closure units 209a and 209b with an internal thread 210a and 210b for a screw connection of the closure units 209a and 209b in the housing 201, and sealing seats 211a and 211b for sealing the closure units 209a and 209b in the housing 201. The closure unit 209a and 209b comprises a valve housing 212a and 212b with a threaded part 213a and 213b and opposite thereto a guide part 214a and 214b. The threaded part 213a and 213b is provided with an external thread 215a and 215b for a screw connection to the internal thread 210a and 210b of the housing 201, an external groove 216a and 216b for the accepting bores 208a and 208b to accept a sealing ring 217a and 217b in order to seal the valve housing 212a and 212b in reference to the housing 201 and a tool accept 218a and 218b for an engagement by a tool to screw the valve units 209a and 209b into the housing 201. The guide part 214a and 214b is provided with an external annular groove 219a and 219b to accept a safety ring 220a and 220b for fixation of the magnetic coil 221a and 221b placed upon the guide part 214a and 214b. Inside the valve housing 212a and 212b a valve piston 222a and 222b is arranged, comprising an anchor 223a and 223b, an actuator 224a and 224b, a spring 225a and 225b, and a closure body 226a and 226b, arranged in a displaceable fashion between the closed position and an open position. The closure body 226a and 226b is accepted at the first end of the magnetic anchor 223a and 223b, with an internal groove 227a and 227b being provided to accept the actuator 224a and 224b for the closure body 226a and 226b. At the opposite second end the anchor 222a and 222b is guided in the guide part 214a and 214b with a slight radial play, with a bore 228a and 228b being provided at the second end to accept the spring 225a and 225b. A sealing area 229a and 229b and an external groove 230a and 230b is embodied at the closure body 226a and 226b comprising a sealing material to support the actuator 224a and 224b.

In another embodiment the closure body 226a and 226b can directly be fastened in the magnetic anchor 223a and 223b without any actuator 224a and 224b, with optionally a ventilation being provided of the rear area of the actuator 224a and 224b.

In another embodiment the closure body 226a and 226b may be embodied with a groove to accept a suitable seal, with optionally ventilation being provided at the rear groove area.

In another embodiment the housing 201 may be embodied with a groove for accepting a suitable seal, with optionally ventilation being provided at the rear groove area.

In another embodiment the sealing area cannot be arranged directly in the housing but at a suitable threaded part or a suitable insert.

In another embodiment a metallic closure body may be used instead of a closure body comprising a suitable sealing material.

In another embodiment the closure units 209a and 209b may be arranged on the low-pressure side.

In another embodiment the closure units 209a and 209b may be arranged at arbitrary positions of the housing.

In another embodiment the closure units 209a and 209b may be arranged at arbitrary positions of the housing. [sic]

In the following the functionality of the pressure control according to the invention is described according to a first embodiment.

As shown in FIG. 2, in the neutral and non-excited state of the magnetic coil 221a the spring 225a and 225b presses the anchor 223a and 223b of the valve piston 222a and 222b downwards, with the sealing surface 229a and 229b of the closure body 226a and 226b being supported at the sealing seat 207a and 207b in the housing 201 and thus seals the flow paths 206a and 206b between the high-pressure chamber 203 and the low-pressure chamber 205.

As shown in FIG. 2.1, by addressing and exciting the magnetic coil 221b the anchor 223b of the valve piston 222b is raised against the acting spring 225b and lifts the sealing surface 229b of the closure body 226b by the actuator 224b off the sealing seat 207b in the housing 201, with the flow path 206b from the high-pressure chamber 203 to the low-pressure chamber 205 being open. The operating state according to FIG. 21 is implemented at high inlet pressures with due to the small size of the area not pressure compensated only requires a low electric power for lifting the valve piston and due to the small diameter of flow released achieves a strong reduction of pressure.

As shown in FIG. 2.2, by addressing and exciting the magnetic coil 221a, the anchor 223a of the valve piston 222a is raised against the acting spring 225a and lifts the sealing area 229a of the closure body 226 via the actuator 224a off the sealing seat 207a in the housing 201, with the second flow path 206a from the high-pressure chamber 203 to the low-pressure chamber 205 being open. The operating state according to FIG. 22 is implemented at moderate and low inlet pressures and due to the large flow cross-section a high mass flow is achieved with a low pressure reduction.

As shown in FIG. 3, the pressure control 300 comprises a housing 301, in which at least an inlet 302 is provided with a subsequent high-pressure chamber 303, an outlet 304 with an upstream arranged low-pressure chamber 305, a flow path 306 between the inlet 302 and the outlet 304, a sealing seat 307 in the flow path 306 between the high-pressure chamber 303 and the low-pressure chamber 305, an accepting bore 308 for accepting the closure unit 309 with an internal thread 310 for a screw connection of the closure unit 309 in the housing 301 and a sealing seat 311 for sealing the closure unit 309 in the housing 301. The closure unit 309 comprises a valve housing 312 with a threaded part 313 and opposite thereof a guide part 314. The threaded part 313 is provided with an external thread 315 for an engagement with the internal thread 310 of the housing 301, an external groove 316 for accepting a sealing ring 317 to seal the closure unit 309 in reference to the housing 301 and a tool accept 318 to be engaged by a tool for the closure part 309 to be screwed into the housing 301. The guide part 314 is provided with an external annular groove 319 to accept a sealing ring 320 for fixing the magnetic coil 321 placed upon the guide part 314. A valve piston 322 is arranged inside the closure unit 309, comprising an anchor 323, an actuator 324, a spring 325, and a closure body 326, displaceable between a closed position of a first open position and a second open position. At the first end of the magnetic anchor 323 the closure body 326 is accepted, with an internal sealing seat 327 being arranged for support at the upper sealing area 328 of the sealing body 326, an interior located groove 329 to accept the actuator 324, and at least one lateral bore 330. At the opposite second end the anchor 323 is guided in the guide part 314 with a slight radial play, with the open end 331 being provided to accept the spring 325. An upper sealing surface 328 is embodied at the closure body 326 comprising a sealing material, opposite the lower sealing surface 332 and with different dimensions, an axial throttle bore 333 between the two sealing surfaces, and an external groove 334 to support the actuator 324 of the closure unit 309.

In the following, the mode of operation of the electromechanical pressure control according to the invention is described:

As shown in FIG. 3, in the neutral and non-excited state of the magnetic coil 321 the spring 325 presses the anchor 323 of the closure unit 309 downwards, with the lower sealing surface 332 of the closure body 326 being supported on the sealing seat 307 in the housing 301 and the upper sealing surface 328 of the closure body 326 at the sealing surface 327 of the anchor 323 and thus closes the flow path 306 between the high-pressure chamber 303 and the low pressure chamber 305. In this operating state a gap 335 is present between the actuator 324 and the closure body 326 in the direction of motion of the valve body 322.

FIG. 3.1 shows that by addressing and exciting the magnetic coil 321 the anchor 323 of the valve piston 322 is raised against the acting spring 325, with the lower sealing surface 332 of the closure body 326 is supported on the sealing seat 307 in the housing 301 and the sealing surface 327 of the anchor 323 is lifted off the upper sealing surface 329 of the closure body 326, thus opening a flow path 306a from the high-pressure chamber 303 via the lateral bore 330 in the anchor 323 and the throttle bore 333 in the closure body 326 to the low-pressure chamber 305. In this operating state a gap 335 is present between the actuator 324 and the closure body 326 in the direction of motion of the valve piston 322. The operating state according to FIG. 3.1 is implemented at high inlet pressures, with due to the small size of the area not pressure-compensated a low electric power is required for lifting the valve piston and due to the small diameter of flow released a strong reduction of pressure is achieved.

As shown in FIG. 3.2, by increasing the excitation of the magnetic coil 321 the anchor 323 of the valve piston 322 is further raised against the acting spring 325, the gap 335 between the actuator 324 and the closure body 326 is closed in the direction of motion of the valve piston 322, and the closure body 326 is lifted off the actuator 324, with the lower sealing area 332 of the closure body 326 being lifted off the sealing seat 307 in the housing 301 and with the open flow path 306a the flow path 306 is open from the high-pressure chamber 303 via the sealing seat 307 in the housing 301 to the low-pressure chamber 305. The operating state according to FIG. 3.2 is implemented at moderate and low inlet pressures and due to the large cross-section of flow a strong mass flow is achieved with a low reduction in pressure.

As shown in FIG. 4 the pressure control 400 comprises a housing 401, in which at least one inlet 402 is provided with a subsequent high-pressure chamber 403, an outlet 404 with an upstream arranged low-pressure chamber 405, a flow path 406 between the inlet 402 and the outlet 404, a sealing seat 407 in the flow path 406 between the high-pressure chamber 403 and the low-pressure chamber 405, an accepting bore 408 for accepting the closure body 409 in the housing 401 including the groove 410 for accepting a safety ring 411 to support a counter fastener 412 for the first spring 413, an accepting bore 414 for accepting the closure unit 415 with an internal thread 416 for a screw-connection of the closure unit 415 in the housing 401, and a sealing seat 417 for sealing the closure unit 415 in the housing 401. The closure unit 415 comprises a valve housing 418 with a threaded part 419 and opposite thereof a guide part 420. The threaded part 419 is provided with an external thread 421 for a screw-connection to the internal thread 416 of the housing 401, an external groove 422 for accepting a sealing ring 423 to seal the closure unit 415 in reference to the housing 401, and a tool accept 424 to be engaged by a tool to screw the closure unit 415 into the housing 401. The guide part 420 is provided with an external annular groove 425 for accepting a sealing ring 426 for fixation of the inverse stroke—magnetic coil 427 placed upon the guide part 420. Inside the closure unit 415 a magnetic anchor 428 and a second spring 429 are provided with less strength than the first spring 413, displaceable between the closed position and a first open position and a second open position. An external sealing seat 430 is arranged at the first end of the magnetic anchor 428 to seal the first sealing surface 431 at the sealing body 409. At the opposite second end the anchor 428 is guided in the guide part 420 with a slight radial play, with the open end 432 being provided to accept the spring 429. At the closure body 409 comprising a sealing material a first sealing surface 431, a second sealing surface 433 with different dimensions, an axial throttle bore 434 between the two sealing surfaces, and an inner bore 435 are embodied to accept the spring 413 and optionally exterior or interior located flow channels 436.

In another embodiment the closure body 409 can be embodied with grooves to accept suitable seals, with optionally ventilation may be provided at the rear groove areas.

In another embodiment the housing 401 can be embodied with a groove to accept suitable seals, with optionally ventilation may be provided of the rear groove area.

In another embodiment the sealing surface may not be embodied directly in the housing but at a suitable threaded part or at a suitable insert.

In another embodiment a metallic closure body may be used instead of a closure part made from a suitable sealing material.

In the following, the operation of an electromechanical pressure control according to the invention is described.

As discernible in FIG. 4, in the neutral and not-excited state of the inverse stroke—magnetic coil 427 the spring 429 presses the anchor 428 of the closure unit 415 against the closure body 409, with the first sealing surface 431 of the closure body 409 being supported at the sealing surface 430 of the anchor 428 and the second sealing surface 433 of the closure body 409 by the force of the spring 413 at the sealing seat 407 in the housing 401, and thus closes the flow path 406 between the high-pressure chamber 403 and the low-pressure chamber 405.

As discernible in FIG. 4.1, by addressing and exciting the inverse stroke—magnetic coil 427, the anchor 428 is moved against the acting spring 433, with the second sealing surface 433 of the closure body 409 being supported by the force of the spring 413 at the sealing seat 407 in the housing 401 and the sealing 430 of the anchor 428 being lifted off the first sealing surface 431 of the closure body 409, with here the flow path 406a being open from the high-pressure chamber 403 via the throttle bore 434 in the closure body 409 to the low-pressure chamber 405. The operating state according to FIG. 4.1 is implemented at high inlet pressures, with due to the small size of the area not pressure-compensated a low electric power is required to lift the anchor and due to the small diameter of open flow a strong reduction of pressure is achieved.

As discernible in FIG. 4.2 by addressing and exciting the inverse stroke—magnetic coil 427 the anchor 428 is moved against the acting spring 413, with the sealing area 430 of the anchor 428 being supported at the first sealing surface 431 of the closure body 409 and the second sealing surface 433 of the closure body 409 being lifted off the sealing seat 407 in the housing 401, with the flow path 406 being open from the high-pressure chamber 403 via the sealing seat 407 in the housing to the low-pressure chamber 405. The operating state according to FIG. 4.2 is implemented at moderate and low inlet pressures and due to the large cross-section of flow a large mass flow is achieved with low reduction in pressure.

FIG. 5 shows the pressure control 500 according to the invention with a modified sealing system between the high-pressure chamber 501 and the low-pressure chamber 502, with the closure body 503 comprises at least one suitable accept 504 for a suitable seal 505, which is supported at the sealing seat 506 in the housing 507 and the anchor 508 comprises a suitable accept 509 for a suitable seal 510, which is supported at the closure body 503, with optionally ventilation is provided at the rear groove areas.

In another embodiment the closure body comprises two accepts for the two seals.

In another embodiment the housing and the anchor each show an accept for the two seals.

In another embodiment the housing comprises two accepts for the two seals.

In another embodiment a separate sheath may be installed in the closure body to stabilize the closure body.

In another embodiment the closure body may be embodied in several parts.

In another embodiment the sealing surface cannot be embodied directly in the housing but at a suitable threaded part or at a suitable insert.

In another embodiment, instead of a closure body comprising a suitable sealing material, a metallic closure body may be used.

Additional embodiments of the sealing system between the high-pressure chamber and the low-pressure chamber develop from a combination of the already-described embodiments for the sealing system.

FIG. 6 shows a pressure control 600 according to the invention with a modified exciter system. The anchor 601 comprises an open end 602 and a closed end 603, with the spring 604 being supported at an exterior shoulder 605 of the open anchor end 602 opposite in reference to an interior shoulder 606 of the open value housing 607 so that by the design of the operating air gap 608 the progression of the magnetic force parameter can be influenced in a targeted fashion.

In general, a closure unit may be used with a discrete switching function (two-position stroke magnet with an open and a closed position, when an electromagnetic closure unit is used) or a continuously switched closure unit (proportional magnet with arbitrary intermediate positions between the open and the closed position when an electromagnetic closure unit is used) to influence the position of the closure body.

In another embodiment the valve housing is provided with a device for the mechanic opening and optionally for the mechanic closing of the closure body.

In another embodiment the valve housing is embodied in several parts for a better magnetic flow.

In another embodiment the anchor is embodied in several parts for a better magnetic flow or for a better guidance in the valve housing.

In another embodiment several magnetic coils may be installed serially.

Additional embodiments develop when the flow paths arranged in a parallel fluidic fashion between the high-pressure chamber at the inlet side and the low-pressure chamber at the outlet side are opened or closed by a rotating actuator or rotating actuators.

FIG. 7 shows different options to embody the actuator function of the valve piston for the pressure control according to the invention as shown in the second embodiment.

FIG. 8 shows the pressure control 800 according to the invention with a heating system to avoid icing or excessive cooling of the pressure control in gases with negative Joule-Thomson coefficient in the operating range of the pressure control, with the generation of heat occurring via an inserted electric heater 801.

FIG. 8.1 shows the pressure control 810 according to the invention with a heating system to avoid icing or excessive cooling of the pressure control in gases with negative Joule-Thomson coefficient in the operating range of the pressure control, with the generation of heat occurring by adding cooling water, with the radiator 811 being installed at the housing 812 in a suitable fashion.

FIG. 8.2 shows the pressure control 820 according to the invention with a heating system to avoid icing or excessive cooling of the pressure control with gases showing negative Joule-Thomson coefficient in the operating range of the pressure control, with the generation of heat occurring by supplying cooling water, which is guided through cooling ducts 821 in the housing 822 of the pressure control.

FIG. 9 shows a control unit 900 comprising at least the pressure control 901 according to the invention, a low-pressure sensor 902, and optionally a high-pressure sensor 903 in a joint housing 904, with if applicable a heating system may be embodied according to FIG. 8, FIG. 8.1 or FIG. 8.2.

FIG. 9.1 shows a control unit 910, comprising at least the pressure control 911 according to the invention, a low-pressure sensor 912 of a low-pressure safety device 913, and optionally a high-pressure sensor 914 in a joint housing 915, with if applicable a heating system being embodied according to FIG. 8, FIG. 8.1, or FIG. 8.2.

A spring-loaded closure body or a blow-out disk may be installed as a low-pressure safety device.

In another embodiment the refueling of the high-pressure reservoir may occur via the control unit using suitably embodied line connections.

In another embodiment the return valve for refueling the high-pressure reservoir may be integrated via the control unit and appropriate line connections in the control unit.

In another embodiment a filter element may be integrated in the control unit.

In another embodiment the refueling coupling to refuel the high-pressure reservoir may be integrated via the control unit and appropriate line connections in the control unit.

In another embodiment a system shut-off valve may be integrated at the high-pressure side or the low-pressure side in the control unit.

In another embodiment a temperature-controlled safety device may be installed in the control unit.

In another embodiment the control unit may be integrated in the cylinder valve.

In another embodiment individual elements of the control unit may be provided in separate housings.

In another embodiment the electronic control device may be installed directly at the control unit or at the pressure control.

In the description a closure unit according to the principle functionality of the electromagnetic energy conversion is considered as the electromagnetic closure unit.

In another embodiment a closure unit according to the principle functionality of the electrohydraulic—mechanic energy conversion, the electropneumatic—mechanic energy conversion, the electromechanic energy conversion (electric engine), or a coupling of arbitrary energy conversion principles is used.

In the following, methods are described for the operation of the pressure control (107, 200, 300, 400, 500, 600, 800, 810, 820, 901, 911).

When the pressure control (107, 200, 300, 400, 500, 600, 800, 810, 820, 901, 911) comprises several flow paths (206*a*, 206*b*, 306, 306*a*, 406, 406*a*) with different cross-sections between the inlet side high-pressure chamber (203, 303, 403, 501) and the outlet side low-pressure chamber (205, 305, 405, 502) a control opens or closes the flow paths (206*b*, 306*a*, 406*a*) with small cross-sections at high pressures or at small volume flows and indirectly at low pressures the flow paths (206*b*, 306*a*, 406*a*) with large cross-sections.

When the pressure control (107, 200, 300, 400, 500, 600, 800, 810, 820, 901, 911) comprises several flow paths with identical cross-sections between the inlet side high-pressure chamber (203, 303, 403, 501) and the outlet side low-pressure chamber (205, 305, 405, 502) a control indirectly opens or closes at high pressures or at low volume flows few flow paths and at low pressures several flow paths.

When the operating pressure is fallen short the control indirectly opens flow paths and indirectly closes flow paths when the operating pressure is exceeded.

The invention claimed is:

1. A pressure control, comprising:
   at least two concentrically arranged flow paths between a first chamber and a second chamber, the flow paths comprising a first flow path and a second flow path; and
   an operable closure unit for opening and closing of the at least two flow paths;
   wherein the operable closure unit comprises a magnetic anchor, an actuator, and a closure body;
   wherein the magnetic anchor is configured and located to open the first flow path by being lifted off an upper sealing surface of the closure body and to close the first flow path;
   wherein the closure body is configured and located to open and close the second flow path;
   wherein the actuator engages with the magnetic anchor and the closure body;
   wherein the magnetic anchor is actuated via a solenoid actuator;
   wherein the at least two flow paths are closed while the operable closure unit is not actuated;
   wherein the first flow path is opened by actuating the operable closure unit, wherein actuating the operable closure unit moves the magnetic anchor to thereby open the first flow path; and
   wherein the second flow path is opened, while the first flow path remains open, by increasing the actuation of the operable closure unit, wherein increasing the actuation of the operable closure unit moves the magnetic anchor further, wherein moving the magnetic anchor further moves the closure body via the actuator to thereby open the second flow path.

2. The pressure control according to claim 1, wherein the individual flow paths comprise identical cross-sections.

3. The pressure control according to claim 1, wherein the individual flow paths are opened or closed independent from each other.

4. The pressure control according to claim 1, wherein the individual flow paths are not opened or closed independent from each other.

5. The pressure control according to claim 1, wherein the flow paths are disposed in a joint housing.

6. The pressure control according to claim 1, wherein the flow paths are not disposed in a joint housing.

7. The pressure control according to claim 1, wherein one or more of the flow paths are disposed in a device to open or close the flow paths.

8. A method to operate the pressure control according to claim 1, wherein the first chamber is an inlet side first chamber and the second chamber is an outlet side second chamber, the method comprising opening the flow paths when an operating pressure is below a first threshold and closing the flow paths when the operating pressure is above a second threshold.

9. The pressure control according to claim 1, wherein the operable closure unit is disposed at a first side towards the first chamber for changing a position of the closure unit.

10. The pressure control according to claim 1, wherein the operable closure unit is disposed at a second side towards the second chamber for changing a position of the closure unit.

11. The pressure control of claim 1, wherein the flow paths are provided in parallel such that each of the at least two flow paths individually fluidly communicates the first chamber to the second chamber when the respective flow path is open.

12. The pressure control according to claim 1, wherein the operable closure unit comprises at least one member of the group consisting of: a mechanical device, a magnetic device, an electrical device, a pneumatic device, a hydraulic device, and combinations thereof.

13. The pressure control according to claim 1, wherein the first flow path has a first cross-sectional area and the second flow path has a second, larger cross-sectional area.

14. The pressure control according to claim 13, wherein the first flow path is opened or closed above a certain threshold pressure or below a certain threshold flow volume.

15. The pressure control according to claim 13, wherein the second flow path is opened or closed below a certain threshold pressure.

16. A fuel supply device for a motor vehicle, comprising:
a control unit comprising the pressure control according to claim 1, wherein the first chamber is an inlet side first chamber and wherein the second chamber is an outlet side second chamber; and
a reservoir, wherein the reservoir is emptied upon discharge via the pressure control;
wherein a flow through the flow paths leads to a pressure reduction of a storage pressure of the reservoir to an operating pressure of a user.

17. The fuel supply device according to claim 16, wherein the control unit further comprises at least one member of the group consisting of: a sensor, a safety device, a thermal safety device, a side system shut-off valve, a filter element, an attached control device, and a heat exchanger.

18. The fuel supply device according to claim 16, wherein the control unit is used for at least one of discharge and refueling, the fuel supply device further comprising at least one member of group consisting of:
line connectors for refueling to connect to a refueling coupling and the reservoir, and
a return valve disposed at the inlet side.

19. The fuel supply device according to claim 16, further comprising a refueling coupling which is integrated in the control unit.

20. The fuel supply device according to claim 16, wherein the pressure control or the control unit is integrated in the reservoir.

21. The fuel supply device according to claim 16, wherein the control unit is addressed by an electronic control device, wherein the electronic control device controls the operating pressure of the user according to at least one member of the group consisting of: specifications of the user, and the storage pressure.

22. A pressure control, comprising:
a first flow path connecting a first chamber to a second chamber;
a second flow path connecting the first chamber to the second chamber in parallel to the first flow path such that each of the first and second flow paths individually fluidly communicates the first chamber to the second chamber; and
an operable closure unit configured to open and close the flow paths, wherein the operable closure unit comprises an actuator, a magnetic anchor and a closure body;
wherein the magnetic anchor is arranged to open the first flow path by being lifted off an upper sealing surface of the closure body and to close the first flow path;
wherein the closure body is arranged to open and close the second flow path;
wherein the actuator engages with the magnetic anchor and the closure body;
wherein the magnetic anchor is actuated via a solenoid actuator;
wherein actuating the magnetic anchor to engage the actuator to a first level $L_1$ causes the operable closure unit to close the first and the second flow paths to fluidly isolate the first chamber from the second chamber;
wherein actuating the magnetic anchor to engage the actuator to a second level $L_2$ actuates the operable closure unit to open the first flow path while the second flow path remains closed, to provide fluid communication between the first chamber and the second chamber through the first flow path, wherein actuating the magnetic anchor to engage the actuator to the second level $L_2$ moves the magnetic anchor; and
wherein actuating the magnetic anchor to engage the actuator to a third level $L_3$ actuates the operable closure unit to open the first flow path and the second flow path, to provide fluid communication between the first chamber and the second chamber through the first flow path and through the second flow path, wherein actuating the magnetic anchor to engage the actuator to the third level L3 moves the magnetic anchor further, wherein moving the magnetic anchor further moves the closure body, via the actuator;
wherein $L_1<L_2<L_3$.

* * * * *